Patented Nov. 15, 1949

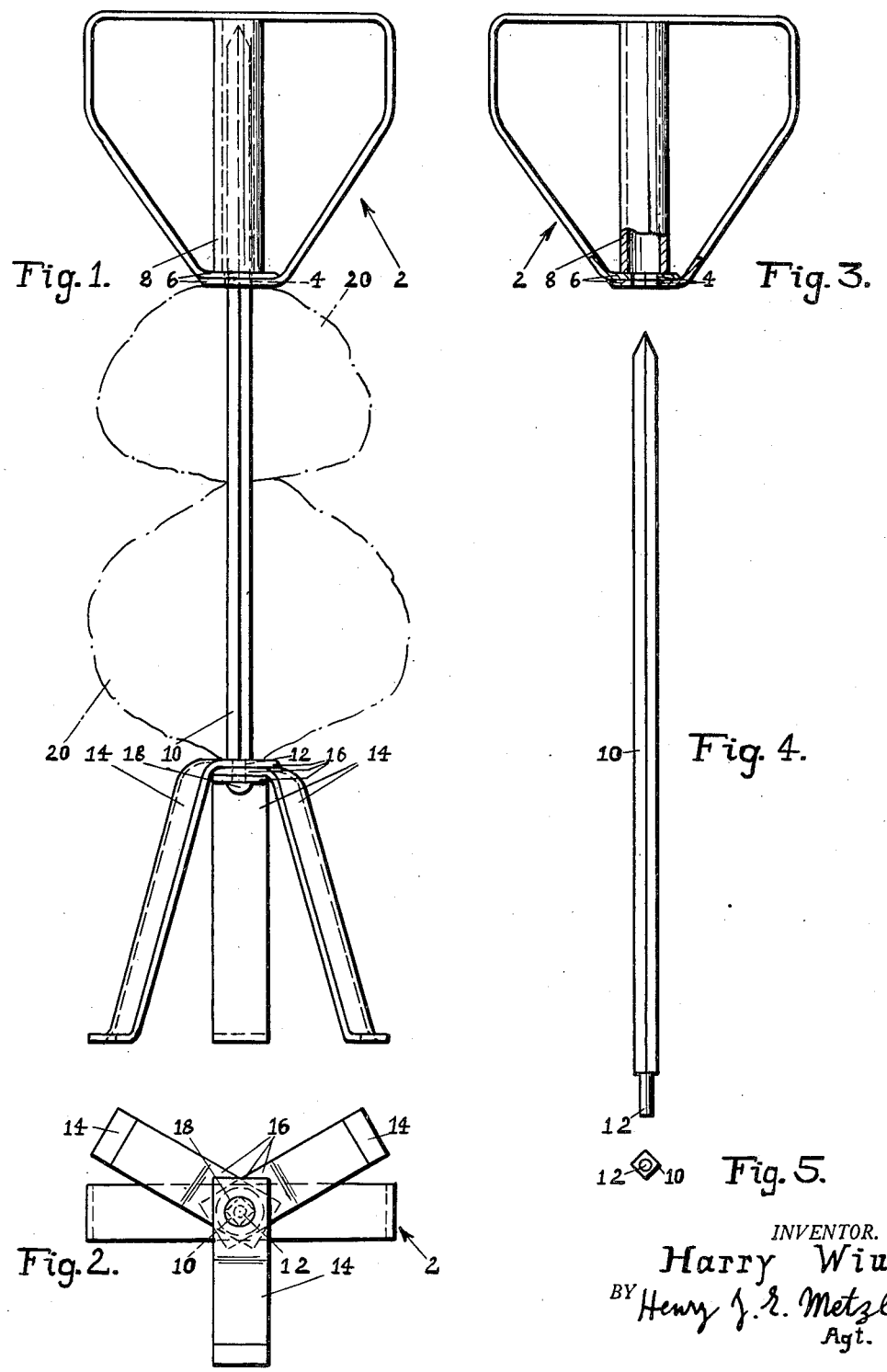

2,488,362

UNITED STATES PATENT OFFICE 2,488,362

GRATING HOLDER FOR POTATOES, FRUITS, AND THE LIKE

Harry Wiur, Richmond Hill, N. Y.

Application March 11, 1949, Serial No. 80,853

2 Claims. (Cl. 146—216)

The present invention relates to improvements in devices for facilitating the use of graters and, more specifically, to a new and improved holder for grating fruits, potatoes, vegetables or the like.

One object of the present invention is the provision of a device of the character described which is adapted to hold removably several potatoes or the like so that they can be grated by rubbing them along any suitable grater, thereby the person doing the grating will engage only a handle of my new and improved holder but not the potatoes or the like themselves.

Still another object of the present invention is the provision of a device of the character described which is light in weight and simple in construction so that it can be manufactured and sold at a very reasonable price, but which is also sturdy, durable, and well adapted to withstand the rough usage to which devices of this type are frequently subjected.

A further object of the present invention is the provision of a device of the character described which can be placed upright upon a table or any other horizontal surface and which for this purpose is provided with a base on which the main portion of the device is rotatable, so that the device can be held with one hand only while with the other hand the operator may rub a grater or the like on the potatoes or the like which are being held by the device.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawings the preferred forms of the invention have been shown.

In said drawings:

Figure 1 is a side elevation of a preferred embodiment of my invention;

Fig. 2 is a bottom plan view of the same;

Fig. 3 is a detailed side elevation of the handle member;

Fig. 4 is a detailed side elevation of a shaft and

Fig. 5 is an end view of the shaft of Fig. 4.

Similar reference characters refer to similar parts throughout the several views.

In the drawing the numeral 2 denotes a handle having the shape of an inverted stirrup and being provided in its lower center portion with a polygonal perforation 4. The handle 2 preferably is made of a bent strip of metal or the like whose ends 6 overlap each other at the lower center portion of the handle 2 and are secured to one another by means of soldering, welding, or the like. The perforation 4 preferably is extended through said overlapping ends 6. A tubular member 8 is secured to said handle and extended vertically from said polygonal perforation to the upper center portion of the handle 2, as may be seen in Figs. 1 and 3. The numeral 10 denotes a preferably polygonal shaft one end of which is pointed while its other end is reduced and formed as a cylindrical end portion 12. The perforation 4 fits the shaft 10, so that the latter can be extended therethrough into the member 8 and is thus non-rotatably connected to the handle 2.

Three or more outwardly and downwardly inclined leg members 14 are provided with horizontal upper portions 16 which are secured to one another by means of soldering, or welding, or the like, and through which the cylindrical end portion 12 of the shaft 10 is rotatably extended. The latter is secured to the legs 14 by forming a rivet head 18 from that end section of the shaft portion 12 which protrudes downwardly beyond the portions 16.

Potatoes 20, or the like can be held on the shaft 10 which pierces them, and when the device stands on the legs 14, the handle 2 can be used for pressing upon the potatoes 20 and for rotating the same and the shaft 10 relative to the legs 14 during the application of a grater (not shown) or the like.

Since certain changes may be made in the above article and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which as a matter of language might be said to fall therebetween.

Having thus fully described my said invention, what I claim as new and desire to secure by Letters Patent in the United States is:

1. The combination, in a grating holder for potatoes and the like, of a longitudinal shaft which is polygonal in cross-section and one end of which is pointed, with a stirrup-shaped handle member having a hollow center portion which is closed at one end and adapted for receiving the pointed end portion of said shaft and for holding it therein nonrotatably relative to said handle, and leg members connected to one another so as to form a base to which said shaft is rotatably secured and which is adapted for supporting said shaft in a vertical position.

2. A grating holder for potatoes and the like comprising a longitudinal polygonal shaft one end of which is pointed while its other end is reduced and cylindrical, a handle having the shape of an inverted stirrup and being provided in its lower center portion with a polygonal perforation which fits around said polygonal shaft, a tubular member being secured to said handle and extended vertically from said polygonal perforation to the upper center portion of said handle, and three inclined leg members having horizontal upper portions which are secured to one another and through which the cylindrical end of said shaft is rotatably extended.

HARRY WIUR.

REFERENCES CITED

The following references are of record in the file of this patent:

UNITED STATES PATENTS

| Number | Name | Date |
| --- | --- | --- |
| 462,626 | Cox | Nov. 3, 1891 |
| 1,741,400 | Bocchino | Dec. 31, 1929 |
| D. 125,253 | Anstead | Feb. 18, 1941 |